July 16, 1968

D. W. PUCKETT 3,393,331

HIGH-TEMPERATURE PROBE

Filed Feb. 28, 1966

INVENTOR.
DAN W. PUCKETT

BY *William J. Miller*

ATTORNEY

United States Patent Office 3,393,331
Patented July 16, 1968

3,393,331
HIGH-TEMPERATURE PROBE
Dan W. Puckett, Ponca City, Okla., assignor to Continental Oil Company, Ponca City, Okla., a corporation of Delaware
Filed Feb. 28, 1966, Ser. No. 530,554
7 Claims. (Cl. 310—8.3)

This application relates in general to a high-temperature measuring apparatus and in particular to a probe useful in measuring thickness of materials which are heated to extremely high temperatures.

It is well known in the art of nondestructive thickness measurement to provide devices for measuring the thickness of material where only one surface is available. This condition arises when measuring the wall thickness of pipe, storage tanks, ship's hulls, and the like. Among the methods heretofore devices for measuring the thickness under these conditions, the most effective have involved ultrasonic techniques for the nondestructive gauging and inspecting of materials. Such ultrasonic instruments are readily available on the market, one type being described by Mr. Loyd Thompson in the magazine Chemical Processing dated Jan. 1, 1966. The apparatus generally described in the article is completely described in application No. 306,068 by Al-G Barnes entitled "Nondestructive Thickness Measuring Device" and assigned to the same assignee as this invention.

In simplified form, the thickness measuring device of the above application operates by utilizing two oscillators. The first being a time pulse generator and the second being an ultrasonic pulse source generator. The output from the ultrasonic pulse generator which is used principally to generate an ultrasonic pulse at a transducer, is also applied to an input of an electronic gate in order to open the gate, permitting the time impulses which are also applied to a second input of the gate, to pass through the gate and to the input of a counter circuit. The signal from the ultrasonic source generator is, as previously mentioned, applied to a piezoelectric crystal transducer. The pulse will mechanically excite the piezo-electric crystal thereby generating an ultrasonic signal. In normal use the transducer is placed against the material desired to be measured. A grease-like or liquid acoustical coupling agent is placed between the transducer and the material under test in order to obtain an adequate acoustical coupling between the transducer and the material to be tested. A coupling agent useful for high temperatures is described in U.S. patent application No. 288,629, filed Aug. 10, 1964, by Norman K. Edwards entitled "Coupling Medium for Ultrasonic Testing of Materials Having Elevated Temperatures" and assigned to the same assignee as this invention. Such material will be more fully described in a later portion of this application.

When the piezoelectric crystal is excited by the pulse from the second signal generator, an ultrasonic wave is generated which passes through the coupling medium and into the steel for material being tested for thickness. When the ultrasonic signal strikes an acoustical discontinuity such as, for example, a flaw, or the opposite side of the material being tested, the ultrasonic signal will be reflected, returning to the piezoelectric crystal, reconverted to an electrical pulse, and transmitted back to the gate. At the instant the return signal is received at the gate, the gate will close, stopping the passage of pulses from the time pulse generator, to the counter. The number of pulses counted will be a measure of the thickness of the material under test.

When high temperatures were being measured, however, it was found that the transducer became inoperative even when a high temperature coupling medium was used.

It is, therefore, an object of this invention to describe a transducer assembly that will operate to at least 800° F. and exceed that temperature with an adequate coupling agent between the test material and the transducer.

It is still further an object of this invention to describe a simple probe that may not only be adapted to any standard transducer but also will render the same usable at high temperatures.

This invention features a high temperature probe which essentially comprises a transducer and a housing for said transducer. A solid plastic ultrasonic signal communicating cylinder of plastic is placed so that its axis is normal to the surface of the transducer and so that the ends of the cylinder of plastic are parallel to the surface of the transducer. A spring is mounted between the transducer surface and a container ring secured to the plastic in a manner to urge the plastic cylinder away from contact with the transducer surface. A mounting means is also secured to the transducer mount and adapted to confine the movement of the plastic cylinder and retain the plastic cylinder in close proximity to the transducer. The plastic cylinder mounting means is also provided with a plurality of air vents so that the plastic cylinder will be adequately cooled during the intervals between measurements.

Other objects and features of this invention will be evident from the detailed description when read in conjunction with the accompanying drawings which illustrate my invention in the drawings.

Figure 1:
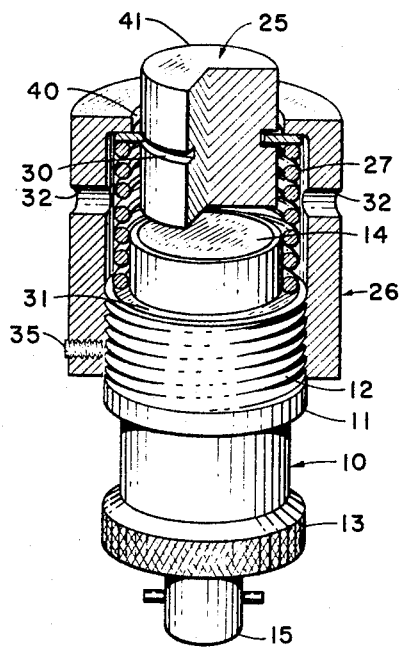
FIGURE 1 is a partial cross-section of the high temperature probe with the transducer shown in full view.
Figure 3A:
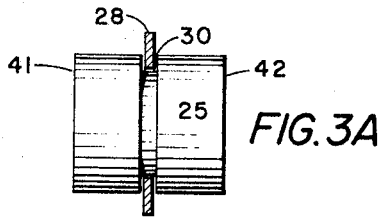
FIGURES 3a, 3b and 3c are cross-sections of various embodiments of the plastic coupling cylinder.

Referring to all of the figures, but in particular to FIGURE 1, a transducer generally referred to as 10 is illustrated. The transducer assembly includes a tubular body 11 having threads 12 on the upper portion and knurled portion 13 at its lower end. Piezoelectric crystal 14 is mounted at one end of tubular body 11 and an electrical input 15 is mounted at the other end. In order to render the piezoelectric crystal 14 operative, both sides of the crystal are silvered. One side is connected to the tubular body 11 and forms the ground for the crystal while the other side (the portion on the inside of the tubular body 11) is electrically connected to a center terminal 20 (see FIGURE 3) of electrical input 15 through a wire 16. (See FIGURE 2.) A resistor 17 provides an impedance match between the transducer and the connecting circuit. The exposed side of the piezoelectric crystal 14 is generally covered with an epoxy type resin in order to protect it from mechanical damage. The resin is not, however, necessary for the operation of the transducer nor for the operation of the transducer in this invention. It serves merely as a protection from mechanical damage to the silver plated surface.

In order to measure high temperatures, an assembly consisting of a high temperature plastic cylinder 25, a holder generally referred to by arrow 26, a biasing spring 27, and a retaining ring 28 are added to transducer 10. Retaining ring 28 is secured to plastic rod 25 by cutting a groove 30 into the plastic rod intermediate and the ends of the plastic rod. The groove has sufficient width to accommodate ring 28 and sufficient depth to prevent the ring from dislodging under contemplated use.

Biasing means 27 essentially comprises a spring placed between a shoulder 31 of transducer 10 and the underside of retaining ring 28. The spring or biasing means 27 has sufficient diameter to fit over the diameter of plastic rod 25 and between the inner walls of holder 26 so that the plastic rod can move freely within the holder. A plurality of vent holes 32 are placed through the walls of holder 26 and serve to permit air to flow easily into and out of the confined space inside holder 26. The holder 26, likewise, contains a plurality of mating threads for engagement with threads 12 on transducer assembly 10. A set screw 35 may be used to secure the position of holder 26 with respect to transducer 10 once the unit is assembled.

Tubular plastic rod 25, which functions as an ultrasonic communication means when used as a high temperature probe, must have a chemical composition which is sufficiently stable at high temperatures to permit use of the probe without substantial destruction of the exposed surface of the plastic rod 25. A suitable plastic for this purpose is made under the trade name VESPEL, manufactured by Du Pont Corporation and is essentially a high temperature polyimide resin. Another plastic that is suitable for the use in high temperature work is polybenzimidazole resin. It is, of course, contemplated that other materials would be equally useful. The main requisite being that the plastic be substantially indestructable at the temperatures used for the time period they are engaged in direct contact with the heated surface and that the total length of plastic used have a low enough impedance to the transmission of ultrasonic energy that sufficient retaining energy which is reflected from an acoustical discontinuity have ample amplitude to operate the electronic circuits where the return signal is used. Other such materials could be; for example, glass, ceramics and nylon. These, of course, are but examples since it is well within the skill of a chemical engineer to devise other plastics or combinations of plastics-ceramics, etc. that could conceivably be used in the application aforementioned.

The theory behind the present invention is essentially as follows. It was discovered during several failures while measuring high temperature steam pipes that piezoelectric crystal 14 ceased operating when it was heated to a temperature of approximately 140 to 150° F. The solution in the past was to insert something between the transducer 14 and the hot surface to be measured; for example, it is well known in the art to utilize a water column. These columns, however, generate an excessive amount of steam during their normal use making the operation a hazardous one when the pipes were extremely hot, to a difficult and uncomfortable one when the pipes were moderately hot. The hazard and discomfort was principally from the excessive amount of steam present during the measuring process. Further measurements tended to be inaccurate due to the natural unwillingness of the operator taking measurements in such an environment.

In order to solve the above problem, a high temperature probe was developed incorporating heat resistant plastics; however, these devices worked satisfactorily for short periods of time and then measurements became unreliable. This invention removes the source of heat from the transducer permitting the tubular element to cool and the transducer to cool during the intervals between measurements.

Referring to FIGURE 1, plastic element or cylinder 25 having an exposed end 41 and an opposite end 42, functions as a communication for the ultrasonic energy from piezoelectric crystal 14 to the material under measurement. Plastic element 25 is retained in axial alignment with tubular holder 10 by housing 26. Opening 40 in the upper end of housing 26 is sufficiently large to permit easy axial movement of plastic rod 25 but sufficiently small to permit retaining ring 28 from passing therethrough. Spring 27 which is placed between shoulder 31 and retaining ring 27 when no pressure is applied to surface 41 of plastic rod 25, forces the end 42 rod 25 away from contactual relationship with the surface of piezoelectric crystal 14. In order to make a good acoustical coupling between the crystal 14 and the end 42 of plastic rod 25, a fluid coupling medium is spread on the exposed surface of crystal 14 and/or rod end 42. Under normal conditions, any suitable oil having sufficient viscosity to remain on the surface and not run off, is adequate.

Spring 27 need not be extremely strong. It must exert only enough force to separate the plastic tube 25 from the crystal surface when the coupling medium is present. If the spring is too strong and the coupling medium too viscous, damage can result to the crystal surface.

The length of plastic rod 25 should also be kept to a minimum in order to minimize the acoustical loss through the rod. In a device constructed in accordance with the teachings of this invention wherein a ¾ inch diameter crystal 14 is used, plastic rod 25 is also ¾ of an inch in diameter. The length between the crystal face of rod 25 and the exposed face 41 is .500 inch. The distance between surface 41 and the groove 30 is .350 inch. The distance between the plastic rod 25 and holder 26; that is, space 40, is .005 inch while the overall diameter of holder 25 is 1.25 inches. The length of the holder is .925 inch with an internal thread portion of .275 inch. The ventilation holes 32 are .25 inch in diameter and placed .29 inch from the upper surface of holder 26 to the center line passing through vent holes 32.

The metal retainer ring 28 can be made of any suitable material and conceivably could be glued to rod 25 or molded as an intricate portion of rod 25. The metal retaining ring must have sufficient outside diameter to engage the spring 27.

OPERATION

Figure 2:
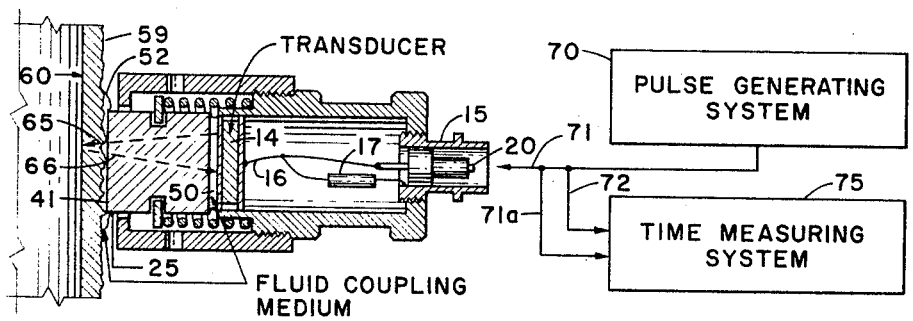
FIGURE 2 is a cross-sectional view of the preferred embodiment of this invention showing the internal position of the elements of the probe when in actual use.

Referring to FIGURE 2, when the high temperature probe is used, a low temperature fluid coupling medium 50 is placed between the crystal surface and the contact end 42 of cylinder 25. A high temperature fluid coupling medium 52 is placed on end 41 of probe 25 and the assembly placed against the outer wall 59 of pipe 60. Sufficient pressure is applied to the probe so that plastic cylinder 25 is forcedly pushed against material wall 59, making good mechanical contact therewith since the surface is generally rough. The high temperature fluid coupling medium 52 will furnish adequate communication for the utrasonic energy to travel from the plastic cylinder 25 to material 59. Thus, the signal will pass through an ultrasonic signal communication path comprising the low temperature coupling medium 50, high temperature plastic coupling medium 25, and high temperature medium 52 to the material to be tested. As shown by arrow 65, after reflection, the signal will travel back through the ultrasonic signal communication system to the crystal 14, as shown by the arrow 66. Thus, a pulse generation system 70, which may be any well known pulse generator, applies the output through a wire 71 to the input 20 and through a wire 72 to an input of the time measuring system 75. The pulse signal from input 20 will pass through wire 16 to the crystal transducer 14.

After the signal returns to the transducer, it is converted again to electrical energy and passes through wires 71a to the time measuring system 75. Since time measuring system 75 has completed the time measurement by an automatic process, or since the operator has determined the thickness of the material by visual means such as reflections displayed on an oscilloscope tube, the pressure is removed from the probe and the probe removed from contactual engagement with wall 59 of pipe 60. Immediately, biasing spring 27 will separate the contactual engagement of plastic cylinder 25 with the transducer 14, forcing the plastic away from the transducer until retainer ring 28 strikes the upper end of holder 26. Plastic cylinder 25 which may get quite hot on end 41 thereby causing an appreciable heat transfer through the plastic, will not transfer any of this heat to the transducer since the two are no longer in contactual engagement with each other. During the interval between measurements, plastic cylinder 25 will cool not only by air convection through vents 32 and radiation to holder 26, but also through direct contact with holder 26 through the retainer ring 28 and spring 27.

High temperature coupling medium 52 should be viscous enough to remain on the spot being tested sufficiently long during the test to cause an accurate reading; that is, coupling medium 52 should not become so fluid or so solid that it will either run out from between the surface 41 and surface 59 thereby causing a loss in the coupling between the two surfaces, or so hard that ultrasonic energy can no longer be transmitted through the material. A suitable coupling agent usable to 800° F. can be made by using a preparation made as follows. Melt together to form a heavy gel the following substances: ten percent of a thickener known as Bentone 34, which is dimethyldioctadecyl ammonium bentonite, and which is a product of the Baroid Division of National Lead Co. of Houston, Tex., one percent alcohol, and the balance consisting of ninety viscosity, bright-stock lubricating oil. (The alcohol is added solely to facilitate manufacture and is not present in the finished product.)

Other successful coupling mediums have been manufactured using combinations of the above using graphite and other high temperature materials. Salts as a whole, however, are not successful since they tend to become hard immediately causing a loss of signal into the material being tested. Other materials that are contemplated are heat softening plastics such as polyethylene, nylon, etc. which tend to soften at extremely high temperatures thereby furnishing an acoustical communication between the plastic rod 25 and pipe 60.

Figure 3B:
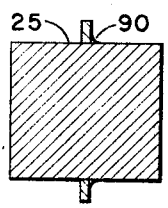
Figure 3C:
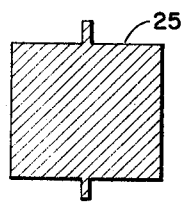

FIGURES 3b and 3c show other means of mounting retaining ring 28; for example, the ring can be fastened by a cement 90 as shown in FIGURE 3b or the retainer actually molded to cylinder 25 as shown in FIGURE 3c.

The description has been limited to the measurement of the wall of a pipe; however, it is obvious that the invention is not so limited and the pipe was used for merely illustrative purposes, nor is the particular method of biasing the plastic rod away from the transducer during non-use periods restricted to an expansion spring. Other modifications can be substituted; for example, compression springs mounted in reverse fashion leave springs, sponge rubber, or any other suitable force having sufficient strength to break the adhesion resulting from the coupling agent 50.

From the foregoing, it will be apparent that the present invention provides a novel high temperature probe which extends the useful temperature range of the average transducer to temperatures well in excess of 700° F. The upper limit of the probe is dictated, not by the construction of the probe itself, but by the high coupling medium communicating the probe with the material to be tested.

Changes may be made in the combination and arrangement of parts or elements and steps or procedures as heretofore set forth in the specification and shown in the drawings; it being understood, that changes may be made in the embodiment disclosed without departing from the spirit and scope of the invention as defined in the following claims.

I claim:
1. A high-temperature probe comprising:
   (a) a transducer having a substantially planar working surface,
   (b) mounting means for said transducer,
   (c) an ultrasonic signal communicating means having a first and second spaced surface substantially parallel to each other,
   (d) means attached to said mounting means for positioning the first surface of said ultrasonic signal coupling means substantially parallel to the planar surface of said transducer,
   (e) means for biasing the first surface of said ultrasonic signal coupling means away from the working surface until pressure is applied to said second surface whereby said first surface and said working surface may become contactually engaged.

2. A device as described in claim 1 wherein said ultrasonic signal communicating means comprises a heat resistant plastic cylinder made from polyimide resin.

3. A device as described in claim 1 wherein said ultrasonic signal communicating means comprises a heat resistant plastic cylinder made from polybenzimidazole resin.

4. A device as described in claim 1 wherein said ultrasonic signal communicating means comprises a heat resistant cylinder made from fired silicon substances selected from the class consisting of ceramics and glass.

5. A device as described in claim 1 wherein said biasing means comprises a spiral spring.

6. A device as described in claim 1 wherein said ultrasonic communicating means comprises a high temperature resistant plastic having a viscous high temperature coupling medium on one end and a viscous low temperature coupling medium on the other end which contacts the surface of said transducer.

7. A device as described in claim 1 wherein said means attached to said mounting means for positioning the first surface of said ultrasonic signal coupling means substantially parallel to the planar surface of said transducer has a plurality of vent openings communicating through the said positioning means.

References Cited

UNITED STATES PATENTS

| | | | |
|---|---|---|---|
| 2,875,607 | 3/1959 | Boxcer | 73—67.9 |
| 2,888,581 | 5/1959 | Pahud | 310—9.1 |
| 2,956,185 | 10/1960 | Stocker | 310—8.7 |
| 3,031,591 | 4/1962 | Cary | 310—9.1 |
| 3,121,326 | 2/1964 | Klatchko | 310—9.1 |
| 3,177,381 | 4/1965 | Bosselaar | 310—8.3 |
| 3,242,723 | 3/1966 | Evans | 310—8.7 |
| 3,283,182 | 11/1966 | Jones | 310—8.7 |
| 3,315,520 | 4/1967 | Carnevale | 310—8.7 |

J. D. MILLER, *Primary Examiner.*